United States Patent Office 3,176,467
Patented Apr. 6, 1965

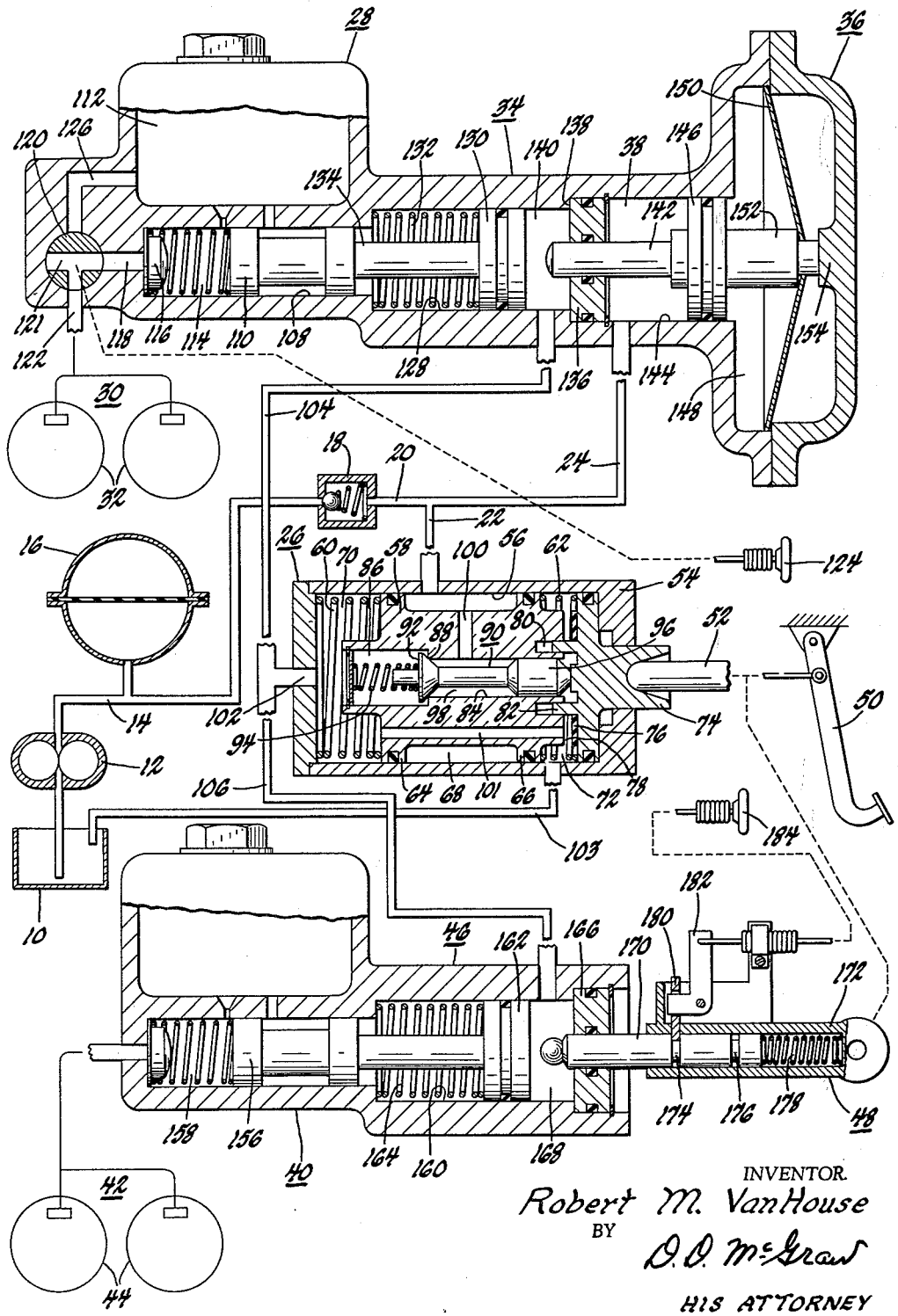

3,176,467
VEHICLE BRAKING SYSTEM
Robert M. Van House, Dayton, Ohio, assignor to General Motors Corporation, Detroit, Mich., a corporation of Delaware
Filed Apr. 26, 1963, Ser. No. 275,898
15 Claims. (Cl. 60—54.6)

The invention relates to a power brake system for an automotive vehicle and more particularly to one which will permit modulated brake application on either the front or rear wheels, or both, even though one or more major components of this system fail to operate satisfactorily. The system preferably operates by hydraulic pressure furnished by a suitable booster pressure source which may be the power steering gear pump.

The system includes separate hydraulic pressurizing systems for the front brakes and the rear brakes with separate master cylinders for pressurizing these systems. An individual power piston is also utilized for each master cylinder. A common control valve assembly is connected with the power pressure pump and with each of the power pistons so as to control the application of power pressure to the power pistons in the normal operating condition.

One of the master cylinders, preferably the master cylinder for pressurizing the front wheel brakes, is equipped with a fail-safe mechanical master cylinder actuating system which is kept in the inoperative position so long as booster pressure is available at the control valve assembly. Should the booster pressure supplied to the control valve assembly drop below a predetermined pressure level, the fail-safe mechanism operates mechanically to actuate the front wheel brake master cylinder to generate a brake apply pressure. This pressure will pressurize the front wheel brakes and hold them in a pressurized condition. A suitable operator-actuatable vent valve is provided as a part of the front wheel brake master cylinder. The valve may be operated to vent the front wheel brake apply pressure so that it is released and fluid returns to the associated master cylinder reservoir. This is done when it is desired to release the front wheel brakes from the effects of the fail-safe mechanism. The front wheel master cylinder remains in the pressurizing position but can have no further effect on the front wheel brakes until the valve is returned to its non-vented position and booster pressure is again supplied to the control valve assembly above the predetermined pressure level. The master cylinder assembly for pressurizing the rear wheel brakes may be operated mechanically by the provision of an extendible push rod mechanically connected to the brake pedal which will permit mechanical actuation of the rear wheel brakes when there is no booster power delivered to the control valve assembly. Thus the rear brakes may be manually applied upon failure of the power braking system to permit cautious use of the vehicle until repairs can be made.

The system will permit normal modulated application of the brakes if the hydraulic power supply fails since it seals the hydraulic booster supply system so that a master piston pressurizes the master cylinder booster pistons upon manual operation of the brake pedal. Should either the front or rear wheel brake pressurizing circuits fail, the system will permit normal modulated application of the operative circuit under power. Should the hydraulic power supply and the rear brake pressurizing circuit fail simultaneously the system will permit continued power application of the front brakes. Simultaneous failure of the hydraulic power supply and the front brake pressurizing system will permit continued power application of the rear brakes.

In the drawing:
The figure is a schematic representation of a system embodying the invention with parts broken away and in section.

The system includes a fluid pressure sump 10 which supplies hydraulic fluid to the pressurizing power pump 12. In a vehicle equipped with power steering, pump 12 may be the power steering gear pump. The pump pressure output is delivered through conduit 14 to a pressure accumulator 16. The accumulator stores sufficient pressure to provide power for several brake applications even though the pump 12 may fail to provide sufficient pressure on a continuing basis. Conduit 14 is also connected to the check valve assembly 18 which permits flow from conduit 14 above a predetermined pressure level but does not permit return flow to the conduit. The other side of check valve 18 is connected to conduit 20, which branches into two conduits 22 and 24. Conduit 22 is connected to the control valve assembly 26.

The system also includes the master cylinder 28 which pressurizes fluid in the brake system 30 connected to the front wheel brakes 32. A power booster assembly 34 is provided for actuation of the master cylinder assembly 28. A master cylinder fail-safe actuating unit 36 is positioned adjacent the booster assembly 34 for mechanical actuation of the master cylinder assembly 28 in a manner and under conditions to be further described. Conduit 24 is connected to the chamber 38 of assembly 36.

The master cylinder assembly 40 is provided to pressurize fluid in the brake system 42 supplying pressure to the rear wheel brakes 44. A power booster assembly 46 is connected to actuate the master cylinder assembly 40 under power supplied by the pump 12 through the control valve assembly 26. An extendible push rod assembly 48 is provided in connection with booster assembly 46 and master cylinder assembly 40 to permit manual operation of the master cylinder assembly 40 upon failure of the system to supply pressure to the booster assembly.

The control valve assembly 26 is operated by the brake pedal 50 acting through the valve actuating push rod 52. Valve assembly 26 includes a housing 54 defining a cylinder 56. A spool master piston 58 is reciprocably received in cylinder 56 and is urged to the right by spring 60 and to the left by spring 62 positioned at opposite ends of the piston. Piston 58 is provided with spaced lands 64 and 66 adjacent the outer ends thereof so that the lands and the main body of the piston cooperate with cylinder 56 to define an annular power pressure receiving chamber 68. Spring 60 is positioned in a chamber 70 defined by housing 54 and piston 58 and engages the outer end of land 64. Spring 62 is positioned in a chamber 72 defined by housing 54 and piston 58 and engages the outer end of land 66. A force transmitting member 74 is positioned in chamber 72 so that it extends through one end of housing 54 and is formed to receive the valve actuating push rod 52. Member 74 is formed as a piston inwardly of chamber 72 so that it seals the end of the chamber. An annular valve seat 76 is positioned on member 74 so that it is engageable with the end 78 of piston 58. An annular recess 80 formed in the piston end 78 reciprocably receives a mating annular land 82 extending axially from force transmitting member 74. Spring 62 urges piston 58 and member 74 apart.

Piston 58 has a centrally disposed passage 84 formed to provide at one end an enlarged chamber 86 fluid connected to chamber 70. The shoulder formed by chamber 86 and the smaller portion of passage 84 provides a valve seat 88. Spool valve 90 is reciprocably received in passage 84 so that the valve head 92 is in chamber 86 and can seat on valve seat 88. Valve return spring 94 in chamber 86 urges the valve head 92 to the seated position.

Valve 90 is also provided with a reduced section intermediate the valve head 92 and the valve land 96 to define an annular chamber 98 in passage 84. A transverse passage 100 in piston 58 joins chambers 68 and 98. The end of valve land 96 engages force transmitting member 74 so that the valve 90 may be moved by the brake pedal 50. An outlet passage 102 is provided from chamber 70 to which conduits 104 and 106 are connected. Conduit 104 is connected to power booster assembly 34 and conduit 106 is connected to power booster assembly 46 to supply booster actuating fluid.

Piston 58 is provided with a passage 101 extending axially therethrough radially intermediate annular chamber 68 and passage 84 so that one end thereof is closeable by seat 76. Chamber 72 is connected through return conduit 103 to the power fluid reservoir sump 10.

The front brake master cylinder assembly 28 includes the cylinder 108 in which the pressurizing piston 110 is reciprocably received. A brake fluid reservoir 112 supplies brake fluid for the front brake fluid system 30. The master cylinder pressurizing chamber 114 is connected through the residual pressure valve 116 and the passage 118 to the vent valve 120. Valve 120 has a T-shaped passage 121 formed therein which is positioned to normally connect outlet passage 118 with the front brake fluid system 30 through conduit 122. Valve 120 may be manually repositioned by the vent valve control 124 so that conduit 122 is disconnected from passage 118 and is instead connected through passage 121 with the vent passage 126. This relieves any brake apply pressure in system 30 and returns the excess fluid from the system to the reservoir 112. Control of valve 120 permits the release of the front wheel brakes when there is insufficient hydraulic power pressure in conduit 24 for the purpose to be described.

The power booster assembly 34 includes the booster cylinder 128 in which is mounted the booster piston 130, the booster piston return spring 132, and the booster piston plunger 134 which is connected to piston 130 and master cylinder piston 110. An annular closure member 136 is located against a shoulder 138 at the rear end of cylinder 128 and cooperates with the cylinder 128 and the piston 130 to define the power chamber 140. Conduit 104 fluid connects chamber 140 with the valve assembly output chamber 70. A plunger 142 extends through closure member 136 and into chamber 140. Closure member 136 is positioned in the enlarged cylinder 144 which also receives the piston 146 to which plunger 142 is attached. Chamber 38 is defined by closure member 136, cylinder 144 and piston 146. The rear end of cylinder 144 opens into a spring mounting chamber 148 in which the Belleville fail-safe spring 150 is mounted. Plunger 142, chamber 38, piston 146, chamber 148, and spring 150 form the elements of the fail-safe actuating unit 36. Spring 150 urges piston 146 to the left at all times. A suitable piston extension 152 engages the inner annulus of spring 150 and is engageable with the stop 154 to limit rearward movement of piston 146 under influence of hydraulic power pressure in chamber 38. When the force of spring 150 overcomes the force of pressure in chamber 38 acting on piston 146, due to a decrease in the power supply pressure, plunger 142 is moved to the left and mechanically engages booster piston 130. Spring 150 is sufficiently strong to overcome booster piston return spring 132 and the master cylinder piston return spring and to pressurize fluid in chamber 114 so as to actuate the front wheel brakes 32.

The master cylinder assembly 40 for the rear brakes is generally similar to master cylinder assembly 28 but has no vent valve or vent passage. The pressurizing piston 156 of assembly 40 pressurizes fluid in the chamber 158 to actuate the rear wheel brakes.

The power booster assembly 46 has a cylinder 160 reciprocably receiving booster piston 162 and the booster piston return spring 164. An annular closure member 166 closes the end of cylinder 160 and cooperates with that cylinder and piston 162 to define the power chamber 168 to which conduit 106 is connected. A plunger 170 extends through closure member 166 and is engageable with the booster piston 162. Plunger 170 is a part of the extendible push rod assembly 48. It is reciprocably received within the tubular rod section 172 and is provided with spaced annular grooves 174 and 176. Spring 178 urges plunger 170 to the extended position. A dog 180 is mounted in rod section 172 so that it is selectively engageable with grooves 174 and 176. When it is engaged in groove 174, as shown in the drawing, the extendible push rod assembly 48 is contracted. When it is engaged with groove 176, the assembly is extended. As is schematically shown, dog 180 may be controlled by the pivotally mounted lever 182 which is actuated through the control knob 184 by the vehicle operator.

In normal system operation, pump 12 maintains accumulator 16 fully charged and, through check valve 18, maintains annular chamber 68 of the valve assembly 26 and chamber 38 of the unit 36 fully charged with power pressure. Piston 146 is therefore held to the right as shown in the drawing and plunger 142 merely acts as a backstop for booster piston 130. Full power pressure is also in chamber 98 of the valve assembly 26. Since valve head 92 is seated against seat 88 there is no back pressure delivered to the booster chambers 140 and 168. The effective areas of valve 90 subjected to power pressure under this condition are equal and opposite so that the position of the valve is not affected.

When the operator desires to actuate the brakes, he depresses pedal 50, moving force transmitting member 74 to the left. This opens valve head 92 relative to valve seat 88, conducting pressurized fluid into chamber 70. At the same time flow from chamber 70 through passage 101 to chamber 72 is being restricted by seat 76 so that pressure is built up in chamber 70 in accordance with the amount of brake pedal movement. This pressure is transmitted to chambers 140 and 168 of the power booster assemblies and acts on booster pistons 130 and 162 to actuate the front and rear wheel brake master cylinders under power. Vent valve 120 is positioned as shown in the drawing under these conditions. Both brake systems 30 and 42 are therefore operated.

Should the pump 12 and accumulator 16 fail to supply sufficient pressure to the system, check valve 18 closes so as to maintain a charge of pressure in conduit 20 and chambers 38, 68 and 98 when the brakes are in the released position. If the brakes are now applied, this pressure is transmitted to booster chambers 140 and 168. The fail-safe spring 150 forces piston 146 and plunger 142 to the left and applies the brakes. Upon releasing the brake pedal, any pressure in chambers 140 and 168 will be relieved through passage 101 and return conduit 103. However, spring 150 will still exert a force through plunger 142 to piston 130 to hold the front brake pressurizing piston 110 in the pressurized position. Thus the vehicle will be held in a brake position even after release of the brake pedal. If the reason for loss of accumulator pressure is determined and corrected, the front brakes will automatically be released when the pressure supplied to chamber 38 is raised to the normal level wherein it moves piston 146 to the right to the position shown in the drawing. If, however, the vehicle must be moved before repairing the cause of system failure, the front wheel brakes 32 must be released. This is accomplished by moving vent valve 120 by means of the valve control 124 so that conduit 122 is connected with vent return passage 126 to return the front system fluid to the reservoir 112 and release the brakes. The dog control knob 184 may also be actuated to disengage the dog 180 from groove 174 and engage it in groove 176. This can be accomplished since spring 178 will extend plunger 170 outwardly upon removal of the dog from groove 174. This releases the brake pedal and causes it to lift to provide a sufficient manual brake actuating stroke. It also engages plunger 170 with the booster piston 162 and permits use of manual rear brake application for cautious vehicle operation.

If while operating in the normal condition, the front wheel brake system 30 fails, normal modulated power application of the rear brake system is continued since the operation of the master cylinder assembly 40 by the power booster assembly 46 is not dependent upon the pressurization of the front wheel brake system 30. A similar situation takes place if the rear wheel brake system 42 fails. The front system may continue to be operated under power.

The combined failure of the hydraulic power supply to conduit 14 and either brake system 30 or brake system 42 will still permit a power application of the unaffected brake system followed by manual pressurization of the booster chambers by movement of master piston 58 through force transmitting member 74 to pressurize chamber 70.

The fail-safe actuating unit 36 and the power booster assembly 34 and the master cylinder assembly 28 may be utilized to operate an entire vehicle brake pressurizing circuit when desired by connecting the circuit 30 to the front and rear wheel brake wheel cylinders, thus eliminating the assemblies 40, 46 and 48. This will cause fail-safe operation of all of the vehicle brakes. In a similar manner the fail-safe actuating unit 36 may be utilized only in its fluid pressure accumulator aspects with the master cylinder assembly 40 being connected to pressurize all of the vehicle brakes to provide at least one power operation of the brakes upon failure of pump 12 and accumulator 16 to keep the fluid in conduit 20 at a predetermined minimum, after which the entire brake system can be fluid operated by piston 58 as a manually powered hydraulic brake system, or operated manually through the extendible push rod assembly 48 directly to the master cylinder piston 156.

What is claimed is:

1. A vehicle hydraulic power brake system comprising a source of hydraulic pressure, a master cylinder for the vehicle front wheel brakes and a master cylinder for the vehicle rear wheel brakes, a hydraulic booster for power actuation of each of said master cylinders to power operate the vehicle brakes, a booster actuating valve assembly hydraulically connected to receive hydraulic pressure from said pressure source and to controllably deliver hydraulic pressure to said boosters to operate said master cylinders, means associated with said front wheel brake master cylinder and booster connected to receive pressure from said pressure source and active at a predetermined pressure low limit to mechanically actuate said fron wheel brake master cylinder to operate the vehicle front wheel brakes independently of hydraulic pressure power from said source, and means for releasing the master cylinder output pressure from said front brake master cylinder after mechanical brake application thereof.

2. A vehicle power braking system comprising a first master cylinder for operating a portion of the vehicle brakes and a second master cylinder for operating another portion of the vehicle brakes, a hydraulic power booster for power operation of each of said master cylinders, a source of hydraulic pressure, a brake control valve assembly, means including a check valve connecting said pressure source with said control valve assembly, means connecting said control valve assembly to deliver hydraulic pressure to said boosters under control of said control valve assembly, servo means associated with said first master cylinder and connected with said source of hydraulic pressure through said check valve means and having a plunger spring biased to mechanically actuate said first master cylinder, said servo means opposing mechanical actuation of said plunger when the servo means is hydraulic pressure energized, manual actuating means for actuating said control valve assembly to normally apply hydraulic pressure from said source to said hydraulic power boosters to operate said master cylinders, said check valve preventing pressure loss from said servo means upon failure of said source to supply hydraulic pressure, said servo means being deenergized upon a brake actuation at a pressure delivered to said control valve assembly below a predetermined pressure level to hold said first master cylinder mechanically energized, and means for releasing the pressure output of said first master cylinder maintained by mechanical energization thereof.

3. A power system for pressurizing first and second hydraulic output circuits, said system comprising first and second pressurizing means and first and second fluid power servo means for respectively actuating said pressurizing means to respectively pressurize said circuits throughout their normal pressurization range, a source of fluid power, control means connecting said source of fluid power to said first and second fluid power servo means and controlling delivery of fluid power thereto, manual means for operating said first pressurizing means independently of fluid power delivered through said control means, and means held poised by fluid power from said source to mechanically operate said second pressurizing means upon decrease of fluid power delivered to said control means below a predetermined fluid power level.

4. The system of claim 3, further comprising means sensitive to a predetermined fluid power level connected intermediate said fluid power source and said control means and intermediate said source and said poised means for holding fluid power in said control means and said poised means upon failure of said source to supply fluid power at or above said predetermined level to permit at least one fluid power operation of said power servo means.

5. The system of claim 3, further comprising manually actuated means for operating said control means to supply controlled fluid power from said source to said power servo means and manually actuated pressurizing means operable by said operating means upon failure of said source to supply fluid power to said control means to pressurize said power servo means.

6. The system of claim 3, said poised means upon actuation thereof holding said second pressurizing means to maintain said second pressurizing circuit pressurized, and means for relieving pressure in said second circuit independently of said second pressurizing means.

7. The system of claim 3, said poised means comprising a spring biased servo receiving fluid power to hold said servo in a position permitting power operation of said second pressurizing means by said second power servo means and moving under spring force upon fluid power loss from said source to provide fluid power to said control means for a single power operation of said first and second power servo means and to then hold said second pressurizing means in a hydraulic pressurizing position by spring force.

8. A vehicle brake system comprising a brake wheel cylinder pressurizing circuit, a master cylinder having pressurizing means for pressurizing said circuit, fluid power actuated means for actuating said master cylinder pressurizing means throughout the normal pressurization range thereof, a source of fluid power, fluid power control valve means connected to control application of fluid power to said fluid power actuated means, and means held poised by fluid power from said source including a mechanically stored energy power actuator to power said master cylinder pressurizing means upon failure of said source to maintain a predetermined minimum fluid power thereto.

9. The vehicle brake system of claim 8, said poised means receiving fluid power from said source to accumulate and store energy in said actuator and to deliver fluid power to said control valve means upon failure of said source to maintain fluid power to said control valve means at a predetermined minimum.

10. The vehicle brake system of claim 8, said poised means mechanically powering said master cylinder pressurizing means upon loss of fluid power from said control valve means to said fluid power actuated means below a predetermined level.

11. The vehicle brake system of claim 8, further comprising means sensitive to a predetermined fluid power delivery level from said source to said control valve means and said poised means for holding fluid pressure to said control valve means and said poised means to permit at least one fluid power operation of said fluid power actuated means.

12. The vehicle brake system of claim 8, said poised means stored energy power actuator holding said master cylinder pressurizing means in the circuit pressurizing position after having powered the same to hold said circuit pressurized at a sufficiently high pressure level to keep the vehicle brakes applied.

13. The system of claim 12, further comprising manually operable valve means in said wheel cylinder pressurizing circuit to relieve the brake holding pressure therein independently of said pressurizing means.

14. A vehicle braking system comprising a brake wheel cylinder pressurizing circuit, circuit pressurizing means, fluid pressure actuated means for actuating said pressurizing means throughout the normal pressurization range thereof, a source of fluid pressure, manually operated control valve means controllably connecting said fluid pressure actuated means to receive fluid pressure from said source to control the pressurization of said circuit, means receiving fluid pressure from said source for storing fluid pressure therein and delivering fluid pressure to said control valve means upon failure of said source to maintain fluid pressure to said control valve means and said storing means at a predetermined minimum to provide at least one power braking operation, and means for manually operating said circuit pressurizing means independently of pressure delivered from said pressure source.

15. The vehicle braking system of claim 14, further comprising means sensitive to a predetermined pressure delivery level from said source to said control valve means and said storing means for holding fluid pressure to said control valve means and said storing means to permit said at least one power braking operation after pressure from said source falls below the predetermined minimum.

References Cited by the Examiner
UNITED STATES PATENTS

| | | | |
|---|---|---|---|
| 2,282,472 | 5/42 | Herman et al. | 60—54.6 |
| 2,626,021 | 1/53 | McAlpine | 303—6 X |
| 3,020,094 | 2/62 | Murty et al. | 303—6 X |
| 3,074,383 | 1/63 | Schultz | 60—54.6 |

JULIUS E. WEST, *Primary Examiner.*

EDGAR W. GEOGHEGAN, *Examiner.*